Aug. 16, 1960 A. A. CRITELLI 2,949,046
INFINITE RATIO TORQUE CONVERTER AND MULTIPLIER
Filed Dec. 17, 1957 3 Sheets-Sheet 1

INVENTOR
ANTHONY A. CRITELLI
BY
Henry Ruhl
ATTORNEY

Aug. 16, 1960  A. A. CRITELLI  2,949,046
INFINITE RATIO TORQUE CONVERTER AND MULTIPLIER
Filed Dec. 17, 1957  3 Sheets-Sheet 2

INVENTOR
ANTHONY A. CRITELLI
BY
Henry Ruhl
ATTORNEY

Aug. 16, 1960     A. A. CRITELLI     2,949,046
INFINITE RATIO TORQUE CONVERTER AND MULTIPLIER
Filed Dec. 17, 1957     3 Sheets-Sheet 3

INVENTOR
ANTHONY A. CRITELLI
BY
Henry Ruhl
ATTORNEY

United States Patent Office

2,949,046
Patented Aug. 16, 1960

---

2,949,046

INFINITE RATIO TORQUE CONVERTER AND MULTIPLIER

Anthony A. Critelli, 125 Terhune Ave., Jersey City, N.J.

Filed Dec. 17, 1957, Ser. No. 703,307

7 Claims. (Cl. 74—688)

The present invention relates to power transmission systems, and, more particularly, to an infinite ratio torque converter which multiplies torque in a novel manner and performs other functions in connection with the transmission of power.

Devices known to the art, which have heretofore been employed as torque converters, have relied solely upon driving means requiring external or auxiliary controls to accomplish needed results in transmission of power. Known transmissions, hand-operated or automatic, are not self-contained.

In accordance with the present invention, mechanical means, such, for example, as planetary gearing, is employed in conjunction with fluid means, in a novel manner, to perform the function of torque conversion. In a torque converter, in accordance with the present invention, with a power plant which will operate at a certain speed with a certain torque factor, the speed will be reduced and the torque factor will be multiplied according to the ratio of the planetary gear system.

Accordingly, the principal object of the present invention is to provide a novel self-contained means, system, or device to multiply torque.

Another object of the invention is to provide a device where speed and torque requirements are proportioned.

A further object of the invention is to provide a novel device where torque multiplication varies in accordance with load requirements.

Still another object is to provide a novel device equipped with a fluid coupling.

A still further object is to provide a novel torque converter having an input unit operating in conjunction with a governing unit.

A still further object is to provide a novel torque converter having a planetary gear with fluid control means reacting between the sun gear thereof and the orbit gear.

Other objects and advantages of the invention will, of course, become apparent and immediately suggest themselves to those skilled in the art to which the invention is directed from a reading of the following specification in connection with the accompanying drawings in which.

Figure 1:
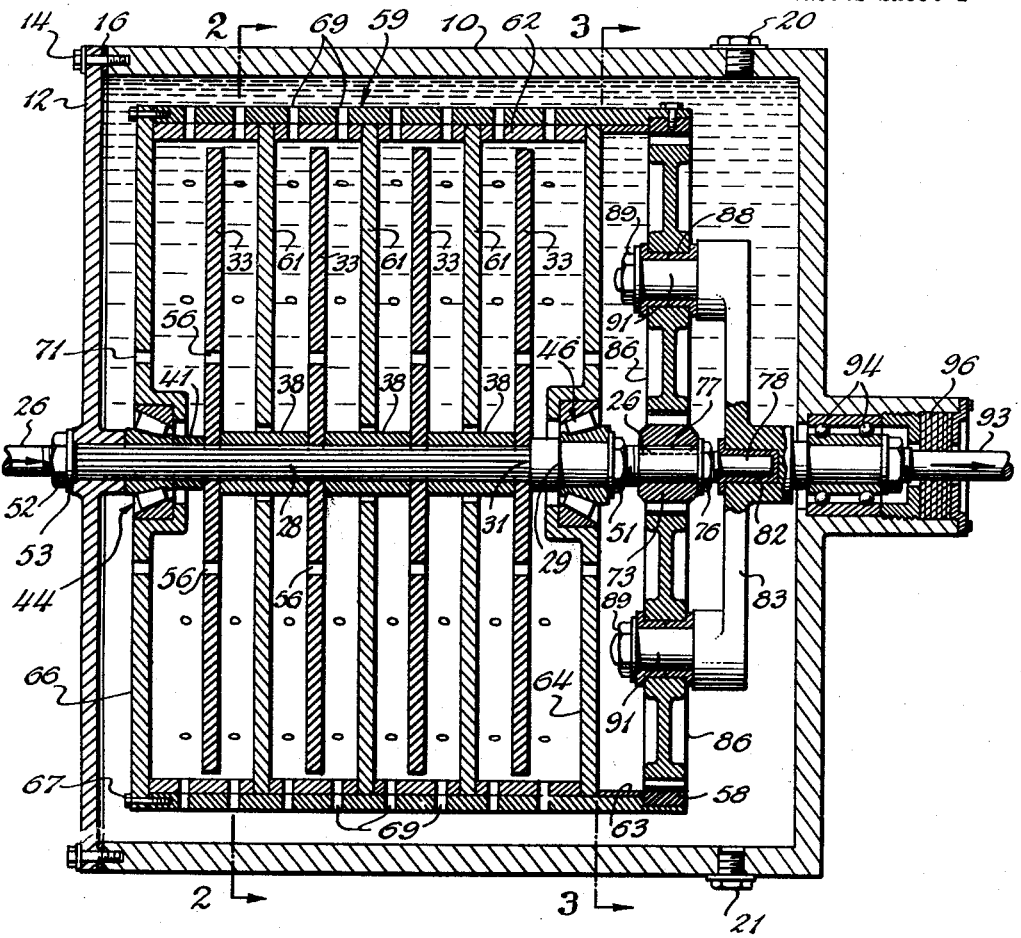
Fig. 1 is a view in sectional elevation of an infinite ratio torque converter transmission involving the present invention, the section being taken through the axis.
Figure 2:
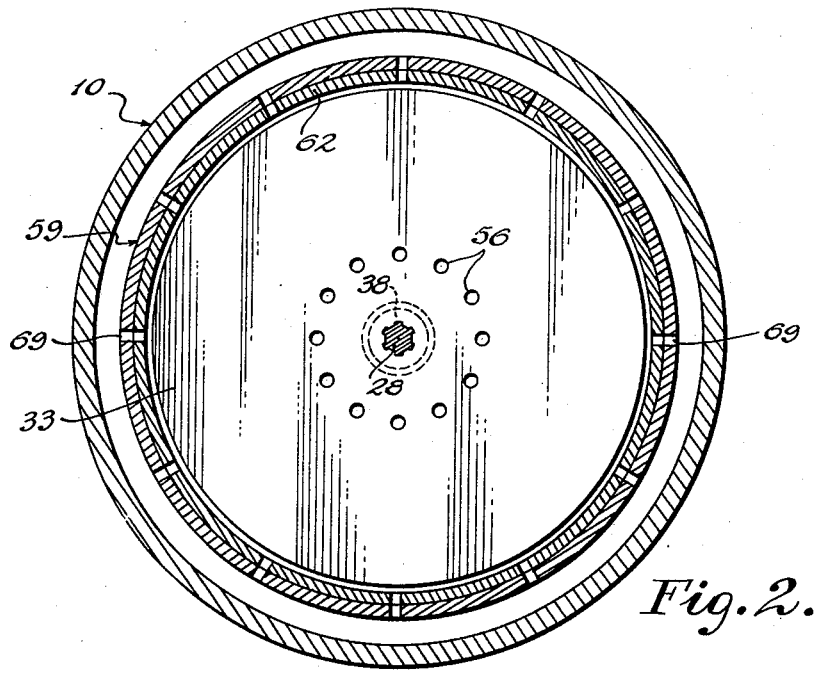
Fig. 2 is a sectional elevation of the device of Fig. 1, the section being taken on line 2—2 as viewed in the direction of the arrows.
Figure 3:
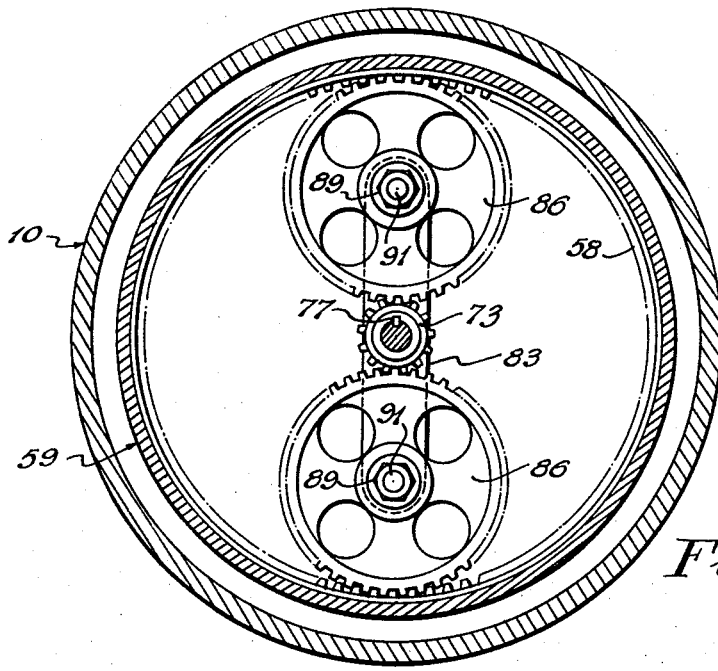
Fig. 3 is a sectional view taken on line 3—3 of Fig. 1, the section being taken as viewed in the direction of the arrows.
Figure 4:
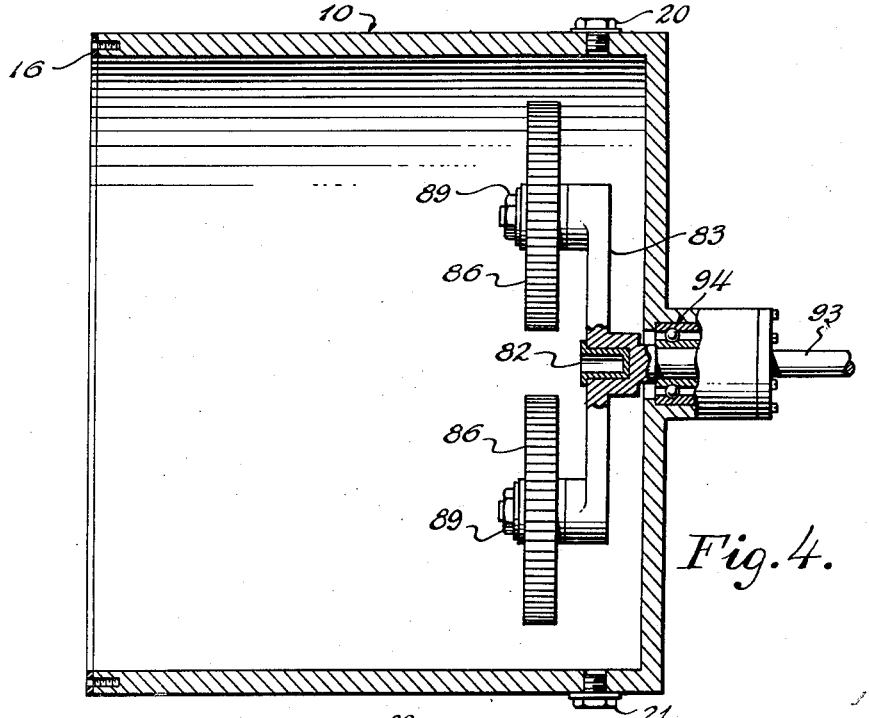
Fig. 4 is a view in section of a part of the apparatus shown in Fig. 1, certain details being omitted for the sake of clearness of illustration and to indicate assembly.

The torque converter of this invention will now be described in detail with particular reference first to Fig. 1 of the drawing. Reference character 10 designates a housing provided with a housing cover 12. The housing cover is secured to the housing by suitable fastening means such as bolts 14. A gasket 16 aids in preventing oil leaks as the housing 10 contains oil. The housing includes provision to fill and drain oil by means of an oil fill plug 20 and an oil drain plug 21.

Reference character 26 designates an input shaft having a splined portion 28. The input shaft also has a shoulder 29 and a shoulder 31. A series of disks 33, four in number in the illustrative example, have a splined connection with the splined portion 28 of the shaft 26. These disks are separated by spacers 38. The end disk rests against the shoulder 31. The disk at the opposite end is abutted by a spacer 41. The inner race of a ball bearing assembly 44 abuts the spacer 41 and the central hub of the cover 12 is seated against this inner race. The inner race of a ball bearing assembly 46 seats against the shoulder 29 and it is retained in this position by means of a nut and washer 51. The previously mentioned cover 12 has a central hub which has a splined connection with a splined portion 28 and a nut 52 and a gasket 53 holds the parts on the shaft in assembled relationship.

The disks 33 are provided with oil holes 56. These oil holes are spaced circumferentially around the shaft 26. The oil holes 56 are as near as possible to the input shaft 26.

Figure 5:
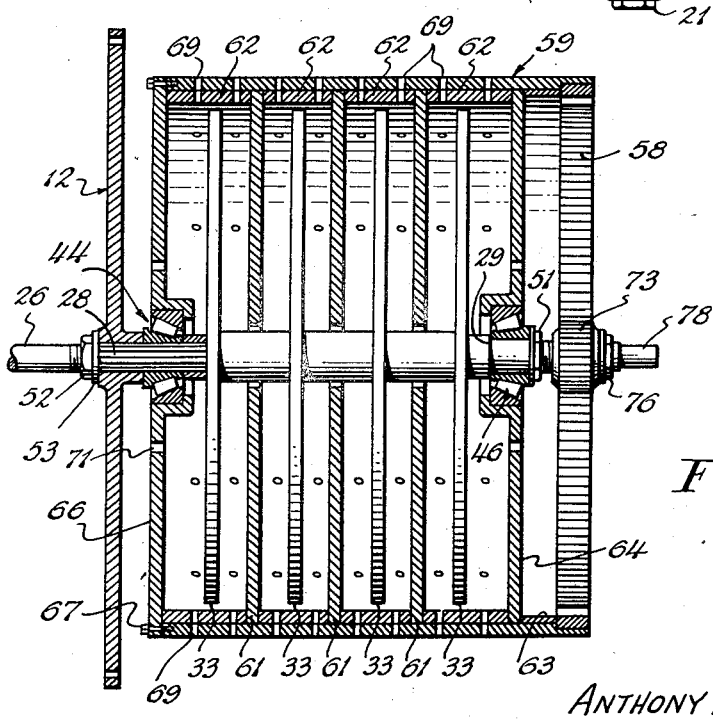
Fig. 5 is a sectional view of a part of the apparatus of Fig. 1 indicating assembly of parts in Fig. 4.

Referring to Fig. 5 there is shown a governing unit comprising an orbit gear 58 and a perforated cylinder 59 having disks 61 therein. The disks 61 are separated and held in position by perforated spacers 62. An additional spacer 63 serves to position a cage cover 64 against the end spacer of the series of spacers 62 where it is held in place by the previously mentioned orbit gear 58. A second cage cover 66 is held in place on the drum by means of bolts 67. The cylinder 59 and the spacers 62 are provided with matching holes 69. The end covers 64 and 66 have oil holes 71 similar to the oil holes 56.

A sun gear 73 is secured at the end of the input shaft 26, being held in place by a nut and washer 76. Also, a key and keyway 77 assist in maintaining the gear 73 on the shaft 26. Other means, it will be understood, may be used to secure the gear 73 to the shaft 26. The shaft 26 ends in a pilot extension 78.

The pilot extension 78 is received in a bearing member 82 seated in a spider or planet carrier 83. The spider 83 carries planet gears 86 which revolve on bushings 88. Nuts and washers 89 secure the bushings 88 in place over the pins 91. The output shaft 93 is connected to or is integral with the spider 83. The shaft 93 revolves in a bearing 94 in the housing 10. A packing 96 serves as an oil seal.

In operation, when the input, including the shaft 26, turns in a clockwise direction, for example, this causes the planet gears 86 to turn counter clockwise. This in turn causes the output unit, including the shaft 93, to turn in a clockwise direction, which, in turn, causes the governing unit, including the gear 58 to turn counter clockwise.

More in detail, the sun gear 73 rotating in a certain direction will cause the planet gears 86 to rotate in an opposite direction causing the orbit gear 58 to rotate in the same direction as the planet gears 86 and in the opposite direction from the input shaft 26. While this is occurring, assuming the load on the output shaft 93 is such that it is at rest, the planetary gear carrier 83 will also be at rest until such time when enough resistance is created by the oil in the housing 10 between the input shaft disk 33 and the governing unit disk 61 in such a way that the governing unit will begin to slow down causing planet gears 86 to "walk" within orbit gear 58 in a fashion that the planet gear carrier 83 will rotate in the same direction as the input shaft 26, thus reducing the rotational speed and multiplying the torque factor to the amount of reduction built into the planetary gear system. At this time the load at the output shaft 93 will be set in motion, thereby reducing the torque requirements at the output shaft 93, resulting in a reduction of rotational speed of planet gears 86 and orbit gear 58 by means of the resistance created by oil between the governing unit disks 61 and the input shaft disks 33 causing the rotational speed of output shaft 93 to increase in proportion to the reduced rotational speed of orbit gear 58 and at this time planet gears 86 and orbit gear 58 will revolve as one unit.

What is claimed is:

1. A torque converter comprising an input unit, said input unit having disks for cooperating with a fluid, a governing unit having an orbit gear connected to a perforated cylinder, perforated spacers maintained in concentric adjacent relationship, disks in said cylinder held in predetermined spaced relationship by said spacers for cooperating with said first named disks and said fluid and an output unit, said output unit having a shaft, planetary gears carried by said shaft, said planetary gears meshing with said orbit gear and a gear connected to said input unit.

2. A torque converter having a sun gear member, means to connect said sun gear member to a motive power input means, planetary gear members, means to connect said planetary gear members to motive power output means, an orbit gear member, fluid immersed means including disks for coupling said orbit gear member to said motive power input means, perforated spacers maintained in cooperating relationship with said disks and a housing for said torque converter, said housing being mechanically coupled to said input means to revolve therewith and having a freely rotatable connection with said motive power output means.

3. A torque converter having a sun gear member, means to connect said sun gear member to a motive power input means, planetary gear members, means to connect said planetary gear members to motive power output means, an orbit gear member, fluid immersed means including perforated disks for coupling said orbit gear member to said motive power input means, perforated spacers holding said disks in predetermined spaced relationship, a housing for said torque converter, said housing being mechanically coupled to said input means to revolve therewith and having a freely rotatable connection with said motive power output means, and a fluid seal at said freely rotatable connection.

4. A torque converter comprising a fluid tight housing, an input shaft porjecting from said housing and secured for rotation therewith, said input shaft having a plurality of disks thereon, perforated spacers in cooperating relationship with said disks to maintain said disks in predetermined spaced relationship, circumferentially arranged oil holes in each of said disks, an internal housing, circumferentially arranged oil holes in the periphery of said internal housing, said internal housing carrying an orbit gear, an output shaft, means in said fluid tight housing rotatably receiving said output shaft, a planetary gear carrier secured to said output shaft, planetary gears on said carrier in mesh with said orbit gear, a sun gear on said input shaft in mesh with said planetary gears, and said internal housing having disks secured thereto and interleaved with said first named disks.

5. A torque converter comprising a fluid tight housing, an input shaft projecting from said housing and secured for rotation therewith, said input shaft having a plurality of disks thereon, circumferentially arranged oil holes in each of said disks, an internal housing, perforated spacers in cooperating relationship with said disks and said internal housing to maintain said disks in predetermined relationship with said housing, circumferentially arranged oil holes in the periphery of said internal housing, said internal housing carrying an orbit gear, an output shaft, means in said fluid tight housing rotatably receiving said output shaft, a planetary gear carrier secured to said output shaft, planetary gears on said carrier in mesh with said orbit gear, a sun gear on said input shaft in mesh with said planetary gears, said internal housing having disks, secured thereto and interleaved with said first named disks, and said internal housing having covers therefor provided with oil holes.

6. A torque converter comprising an input shaft, said input shaft having a plurality of disks thereon, circumferentially arranged oil holes in each of said disks, a housing, perforated spacers, said spacers being maintained in cooperating relationship with said disks and said housing, circumferentially arranged oil holes in the periphery of said housing, said housing carrying an orbit gear, an output shaft, a planetary gear carrier secured to said output shaft, planetary gears on said carrier in mesh with said orbit gear, a sun gear on said input shaft in mesh with said planetary gears, and said housing having disks secured thereto and interleaved with said first named disks.

7. A torque converter comprising an input shaft, said input shaft having a plurality of disks thereon, circumferentially arranged oil holes in each of said disks, a housing, perforated spacers, said spacers being maintained in cooperating relationship with said disks and said housing, circumferentially arranged oil holes in the periphery of said housing, said housing carrying an orbit gear, an output shaft, a planetary gear carrier secured to said output shaft, planetary gears on said carrier in mesh with said orbit gear, a sun gear on said input shaft in mesh with said planetary gears, said housing having disks secured thereto and interleaved with said first named disks, and said housing having covers therefor provided with oil holes.

References Cited in the file of this patent

UNITED STATES PATENTS

| | | |
|---|---|---|
| 1,696,307 | James | Dec. 25, 1928 |
| 1,870,076 | Thomson | Aug. 2, 1932 |
| 2,129,884 | Swan | Sept. 13, 1935 |
| 2,431,318 | Ellis | Nov. 25, 1947 |
| 2,645,136 | Neal | July 14, 1953 |
| 2,714,946 | Tenot et al. | Aug. 9, 1955 |
| 2,792,722 | Stefan | May 21, 1957 |